(12) United States Patent
Ruech et al.

(10) Patent No.: US 7,445,722 B2
(45) Date of Patent: Nov. 4, 2008

(54) THERMAL WATER TREATMENT METHOD

(75) Inventors: Wolfgang Ruech, Taiskirchen (AT); Christoph Neumüller, Linz (AT); Frank Schröder, Albrechtshain (AT)

(73) Assignee: AMI - Agrolinz Melamine International GmbH, Linz (AT)

( * ) Notice: Subject to any disclaimer, the term of this patent is extended or adjusted under 35 U.S.C. 154(b) by 317 days.

(21) Appl. No.: 10/519,261

(22) PCT Filed: Jun. 23, 2003

(86) PCT No.: PCT/EP03/06589

§ 371 (c)(1),
(2), (4) Date: Aug. 31, 2005

(87) PCT Pub. No.: WO04/000733

PCT Pub. Date: Dec. 31, 2003

(65) Prior Publication Data

US 2006/0011560 A1  Jan. 19, 2006

(30) Foreign Application Priority Data

Jun. 25, 2002  (DE) .............................. 102 29 103

(51) Int. Cl.
C02F 1/02  (2006.01)
(52) U.S. Cl. ....................... 210/774; 210/903; 210/908; 544/203
(58) Field of Classification Search .................. 210/774

See application file for complete search history.

(56) References Cited

U.S. PATENT DOCUMENTS

| | | | |
|---|---|---|---|
| 2,838,574 A | | 6/1958 | Cofer |
| 2,992,703 A | * | 7/1961 | Vasan et al. ..................... 95/93 |
| 4,013,757 A | | 3/1977 | Berkowitz et al. |
| 4,308,385 A | * | 12/1981 | Goorden ...................... 544/201 |
| 5,096,599 A | | 3/1992 | Granelli |
| 5,447,195 A | | 9/1995 | Luyts |
| 5,548,906 A | | 8/1996 | Lee et al. |

FOREIGN PATENT DOCUMENTS

| | | |
|---|---|---|
| DE | 1 584 889 | 2/1970 |
| DE | 199 29 212 C2 | 12/2000 |
| DE | 100 18 096 C1 | 1/2002 |
| DE | 101 54 471 A1 | 5/2002 |
| GB | 1 497 493 | 1/1978 |
| JP | 2000-237761 | 9/2000 |
| RU | 2 052 390 C1 | 1/1996 |
| RU | 94046075 | 9/1996 |
| SU | 709548 | 1/1980 |
| WO | WO 93/23497 | 11/1993 |
| WO | WO 02/081379 A1 | 10/2002 |

* cited by examiner

Primary Examiner—Peter A. Hruskoci
(74) Attorney, Agent, or Firm—The Webb Law Firm

(57) ABSTRACT

The invention relates to a device for thermally purifying waste water, comprising a tank through which waste water can flow. The inventive device is characterized by having at least one flow guiding means for guiding the waste water inside the tank in an essentially meandering manner, and by having at least one heating means inside the tank for regulating a predetermined temperature.

7 Claims, 2 Drawing Sheets

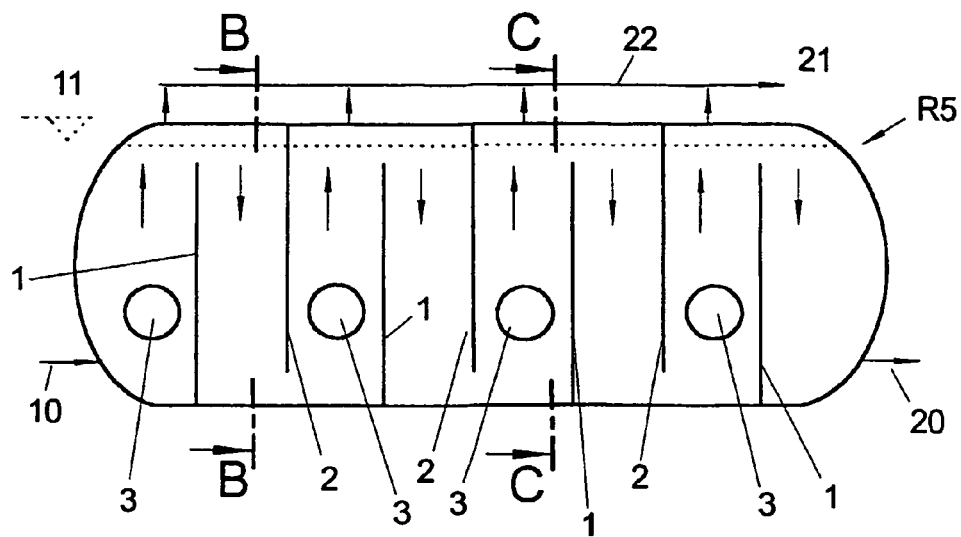
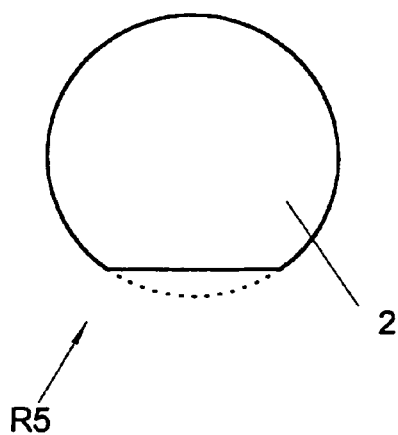
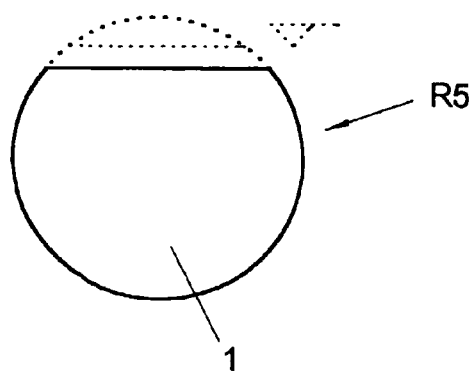

THERMAL WATER TREATMENT METHOD

BACKGROUND OF THE INVENTION

1. Field of the Invention

The invention relates to a device for thermal waste water purification with a container through which the waste water flows and a method of purifying melamine-containing waste water.

2. Description of the Related Art

In processing technology it is often necessary to cleanse waste water flows of undesired substances. For this it is known to treat the waste water thermally.

So that treatment is successful, ie that it reaches the required quality for introduction into bodies of water a certain dwell time is required at predetermined temperatures.

SUMMARY OF THE INVENTION

One object of the present invention is to provide a device which is particularly suitable for cleansing waste waters.

The present invention is directed to a device for thermal waste water purification. By using at least one flow guide means the waste water is guided in a meandering fashion into the container. This prevents any mixing back. Setting a predetermined temperature is possible through at least one heating means in the container (hydrolyser).

Advantageously the flow guide means have at least one wall around which the waste water flow is directed. It is particularly advantageous if a wall with overflow weir and a wall with underflow weir are provided alternately and parallel as the flow guide means. The waste water is thereby directed along a meandering path through the container.

Advantageously a heating means is provided between two flow guide means, more particularly in an area of an uprising flow. The flow is assisted through the rising bubbles.

It is thereby advantageous if a heating means has a device through which steam flows, more particularly a tube bank. It is also advantageous if the heating means has electric heating.

A particularly advantageous development is if the container is formed cylindrical whereby the longitudinal axis is horizontal. In a further advantageous development the container has a collecting pipe for discharging gases on the top side.

It is also advantageous if at least two devices of this kind are connected in series.

The problem is also solved for melamine-containing waste water through a method having the features of claim 9. According to this for an efficient degradation the temperature in the device is set greater than 190° C., more particularly in the region of 220° C. to 240° C. The pressure is advantageously between 30 bar and 100 bar, more particularly between 30 bar and 60 bar.

BRIEF DESCRIPTION OF THE DRAWINGS

FIG. 2a is schematic sectional view along the longitudinal axis of an embodiment of a device according to the invention;

FIG. 2b is a schematic sectional view across the longitudinal axis along the plane B-B of FIG. 2a; and FIG. 2c is a schematic sectional view across the longitudinal axis along the plane C-C of FIG. 2b.

DETAILED DESCRIPTION OF THE PREFERRED EMBODIMENTS

Figure 1:
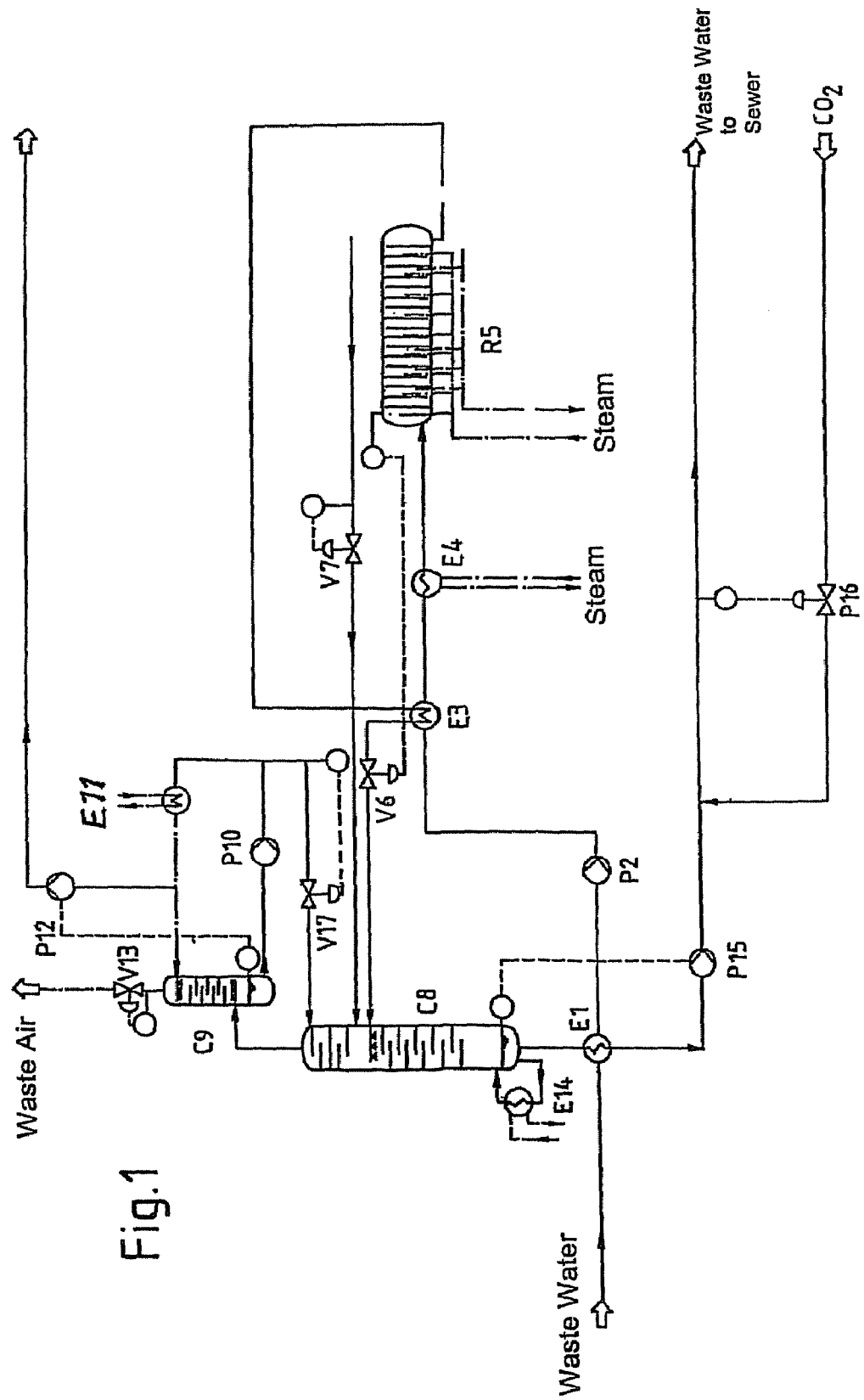
FIG. 1 is a flow diagram for waste water purification in a melamine plant including a device according to the present invention.

One embodiment of the method according to the invention and one embodiment of a device according to the invention will now be explained with reference to treating waste water from a melamine plant. Fundamentally the device can be used however for processing other waste water.

Before going into the structural design of the device the waste water purification process will now be described.

The waste water coming from a melamine plant or from a collecting container system contains a mixture of the following substances or their ammonium and sodium salts (typical values)

| | |
|---|---|
| Ammonia | 1-10 g/kg |
| Carbon dioxide | 1-18 g/kg |
| Urea | with starting and finishing processes |
| Cyanuric acid | 0.1-0.2 g/kg |
| Ammelide | 2-6 g/kg |
| Ammeline | 4-12 g/kg |
| Melamine | 2-6 g/kg |
| Melam | 0.01 g/kg |
| Cyanmelamine | |
| Ureidomelamine | |
| NaOH | 7-17 g/kg |
| Fogt | pH value of about 12 |

The aim is to break down the noxious water content substances of the waste water in order to obtain $CO_2$, $NH_3$ or $HCO_3^-$, $CO_2^-$ and $NH_4^+$. A neutral to at least 30° C. coolable, ammonia-free waste water is to be produced (depending on the introductory conditions). $NH_3$ and parts of the $CO_2$ are to be used further.

The compound which most heavily precipitates from waste water is melamine cyanurate, a salt of the cyanuric acid. The cyanuric acid must therefore be adequately broken down.

When cooling precipitating melamine cyanurate the cooler moves immediately. If the solid is crystallised out in a crystallisation apparatus this is expensive and the use of the solid becomes difficult. Melamine has mostly still a slightly higher concentration which however if the ammonia is satisfactorily separated off, is mostly still not critical for the introductory conditions as far as the permitted limit values are concerned.

All melamine and oxoaminortiazine (OAT) are broken down with water step by step to ammonia and carbon dioxide. The equilibrium pressure which is set through the solution and has to be maintained in order to prevent evaporation depends on the temperature and the ammonia and carbon dioxide content of the solution.

In order to obtain an acceptable breakdown speed of the undesired substances in the waste water, the temperature has to be selected above 190° C. The higher the temperature is selected the faster the reaction of the breakdown which has a tendency to reduce the size and costs of the apparatus. However with rising temperature the equilibrium pressure rises which has a tendency to increase the cost of the apparatus owing to the increasing wall thicknesses. A small part can also be evaporated. Since the steam has a significantly higher ammonia and carbon dioxide concentration than the liquid the concentration of these substances drops in the liquid phase and the equilibrium pressure falls which leads to a cheaper apparatus. Since the main part of the steam consists of water however and upsets the heat balance with a counter flow inlet/outlet heat exchange, the evaporation represents a considerable loss of energy which pushes up the processing costs.

An optimum is sought between these tendencies which lies at 220 to 260° C. reaction temperature and pressure of 30 to 100 bar, more particularly 30 bar to 60 bar. The evaporation is then produced from the charge of the waste water.

The basic flow chart is shown in FIG. 1. The device according to the invention for thermal degradation is the hydrolyser R5 through which the waste water flows. The connection of this apparatus to the melamine plant will now be explained.

The loaded waste water is preheated in the heat exchanger E1 with the residual heat of the waste water drawn off from the column sump C8. It is brought by the pump P2 to the hydrolysis pressure, ie the pressure at which the thermal degradation is to be operated. In the counter flow heat exchanger E3 it is preheated practically to the reaction temperature with the heat of the water flowing down from the hydrolyser R5. The heat exchanger E4 serves for starting up the plant and for compensating the radiation and heat exchange losses. In the heated hydrolyser R5 the chemical reactions to ammonia and carbon dioxide take place at reaction pressure and reaction temperature. The pH value thereby drops. Reaction heat and steam losses are supplied through the heat register in the hydrolyser R5. The pressure in the hydrolyser R5 is regulated through the relief valve V7. The steam is supplied to the column C8. The filling level in the hydrolyser R5 is regulated through the relief valve V6 after the outflow has given off its heat in the counter flow heat exchanger E3 to the supply current. Thus apart from the vapour losses minimal heat losses arise, the same pressure, reaction pressure, prevails on both sides of the heat exchanger, and at the fluid relief valve V6 there is no resulting partial evaporation.

In the divided column C8, C9 the ammonia is expelled in the column C8. The column C8 is heated at the sump through the heat exchanger E14. The waste water is drawn off at the sump of the column through the said heat exchanger E1 with the pump P15 regulated as regards filling level. The waste water is neutralised with the carbon dioxide and supplied to the sewer. The steam of the column C8 is supplied to the gas washer C9 at the bottom. Liquid is drawn off at the sump from C9 through P10. This is divided flow regulated through V17 into a return for C8 and into a return for C9 which is sharply cooled through E11. Through the sharp cooling of the return from C9 the entire gas flow can be condensed in C9. A part of the flow supplied by P10 is furthermore circulated out through a filling regulation through the pump P12. This flow is a concentrated aqueous solution of ammonia and carbon dioxide which is worked up in the urea plant. The pressure is kept in the column through the valve V13 and inert circulated out. The waste air can be supplied to a washer.

FIGS. 2a, 2b, 2c show an embodiment of the hydrolyser R5. FIG. 2a shows a diagrammatic sectional view. FIGS. 2b and 2c show sections along the lines B-B and C-C respectively.

The hydrolyser R5 can in principle also be formed in several apparatuses arranged in series whereby the main gas proportion arises in the first.

The hydrolyser R5 is a cylindrically disposed apparatus whose ends are closed by elliptical bases. The interior consists of a system of several connected chambers which are formed as flow guide means through the alternately arranged overflow and underflow weirs 1, 2. The weirs ensure an alternating up and down flow of the fluid and thus provide for little back mixing. The waste water enters at the inlet 10 into the hydrolyser R5 and flows through the apparatus according to the arrow in the direction indicated and emerges from the apparatus at the outlet 20 again.

In the lower part of the chambers on upstream is located a heating register 3 as heating means. The bubble formation which starts through the heat input thus assists the overall flow.

The heating register 3 consists for example of a pipe coil or tube bank which can be heated with steam. Also other installations eg screen bases are possible in place of the weirs. The liquid level 11 stands between the upper edge of the apparatus and the upper edge of the overflow weir 1 so that on the one hand the overflow is ensured and on the other hand a common gas chamber is formed between the upstream and downstream chamber. Each gas chamber is linked into a collecting pipe 21 lying above same which enables gas discharge 22 and breathing and thus a uniform filling state in all chambers.

Two sectional views are shown in FIGS. 2b and 2c along the planes B-B and C-C. FIG. 2b thereby shows a side view of a flow guide means 2 with an underflow weir. FIG. 2a shows a flow guide means 1 with an overflow weir.

The invention is not restricted in its design to the aforementioned preferred embodiments. Rather a number of variations are possible which make use of the device according to the invention and the method according to the invention even with basically different designs.

The invention claimed is:

1. A method for thermal waste water purification of melamine-containing waste water, using a device with a container through which waste water flows; wherein the device includes a plurality of flow guide means which, alternately in parallel as overflow weir and as underflow weir, is arranged to form a chamber for a meander-shaped guide of the waste water in the container, and at least one heating means, which is arranged between two flow guide means in a lower part of the chamber of the container at the beginning of a rising flow; the method comprising the steps of:

producing a supported flow in the chamber; and
   setting to a predetermined temperature;
   wherein the temperature in the device is greater than 190° C.; and
   wherein the heating means provides rising bubbles to assist said rising flow in the chamber.

2. The method according to claim 1, wherein the temperature in the device lies in the range of 220° C. to 230° C.

3. The method according to claim 1, wherein the pressure in the device is between 30 and 100 bar.

4. The method according to claim 1, wherein the pressure in the device is between 30 and 60 bar.

5. The method according to claim 1, further comprising the step of preheating the waste water at least once before the device.

6. The method according to claim 1, further comprising the step of preheating the wastewater supplied to the device by a heat exchanger, which is heated in the counter flow with an output flow of the device.

7. The method according to claim 1, further comprising the step of guiding the waste water through the device to a column, whereby a head product of the column is directed to a gas washer.

* * * * *